R. O. WELLS, Sr.
FISHING FLOAT.
APPLICATION FILED FEB. 28, 1920.

1,371,188.

Patented Mar. 8, 1921.

INVENTOR.
R. O. Wells Sr.
BY Victor J. Evans
ATTORNEYS.

UNITED STATES PATENT OFFICE.

RICHARD O. WELLS, SR., OF CHICAGO, ILLINOIS.

FISHING-FLOAT.

1,371,188.   Specification of Letters Patent.   Patented Mar. 8, 1921.

Application filed February 28, 1920.   Serial No. 361,917.

*To all whom it may concern:*

Be it known that I, RICHARD O. WELLS, Sr., a citizen of the United States, residing at Chicago, in the county of Cook and State of Illinois, have invented new and useful Improvements in Fishing-Floats, of which the following is a specification.

This invention relates to a fishing float and has for its primary object the construction of a float that may be quickly connected to a line and when in place will not distort the line.

An object of the invention is the novel manner of clamping the line to the float so that when a pull is exerted on the line the float will not be subject to a strain. Besides the above my invention is distinguished in the novel manner of clamping the float to the line so that the position of the float can be fixed.

With these and other objects in view the invention will be better understood from the following detailed description taken in connection with the accompanying drawing wherein—

Figure 1:
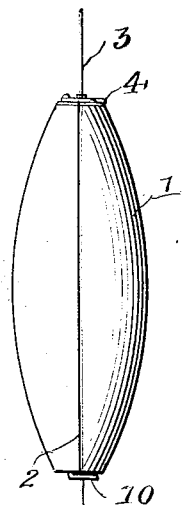
Figure 1 is a side elevation of the float.
Figure 3:
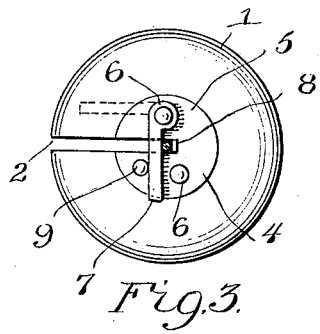
Fig. 3 is a view looking at the upper end of the float.
Figure 2:
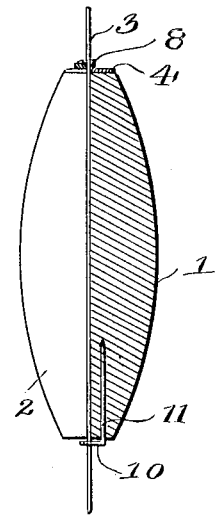
Fig. 2 is a vertical sectional view.
Figure 4:
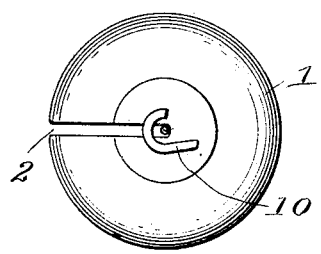
Fig. 4 is a view looking at the lower end of the float.

Again referring to the drawing illustrating two constructions of my invention and more particularly to Figs. 1 to 4 inclusive, the numeral 1 designates a body constructed in a manner or of a floatable material to float upon the surface of the water. The body is provided with a slot 2 extending to the center of the body for the reception of the line 3. From this construction it will be seen that the line passes directly through the body without having its direction of travel changed, thereby allowing the line to be subjected to excessive strain without transmitting the strain to the float. For the purpose of clamping the line to the body without interfering with the foregoing advantage I provide the clamping device 4 which consists of a plate 5 secured to the body by the pins 6. Upon one of the pins 6 is pivoted a clamping member 7 in the form of a lever moving in a direction to clamp the line between it and a shoulder formed by the flange 8 extending from the plate. The member 7 in moving to clamping position springs over a retainer in the form of a knob 9 pressed from the plate.

For the purpose of holding the lower end of the body associated with the line I provide a hook 10 provided with a shank 11 driven into the body and as this shank 11 is of cylindrical outline the hook portion may be thrown into and out of locking position with relation to the line.

Figure 6:
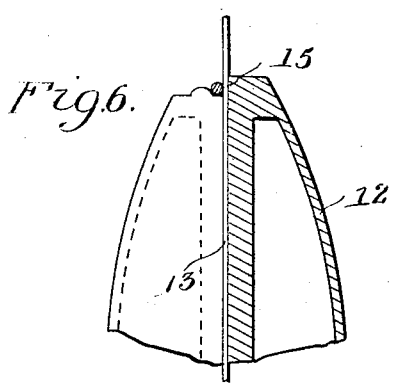
Figs. 5 and 6 are views of modified forms of my invention.
Figure 7:
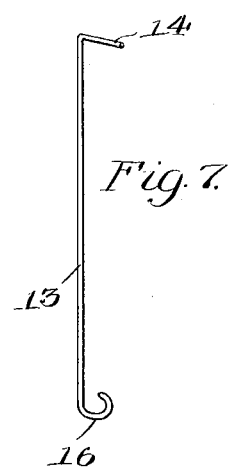
Fig. 7 is a perspective view of a modified form of clamping member.
Figure 5:
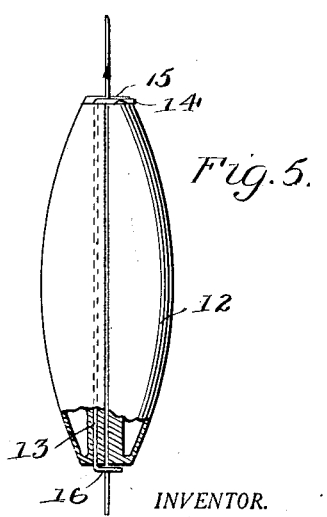

Referring to Figs. 5 to 7 inclusive I have illustrated a hollow body 12 which may be made of metal, such as aluminum. In this practical case the clamping device and hook are formed from a single length of wire 13 having one end formed into a crank arm 14 for coöperation with the shoulder 15 on the body for clamping the line, and its other end formed into a hook 16 for engagement around the line.

It is, of course, to be understood that the float may be constructed in various other manners and the parts associated in different relations and therefore I do not desire to be limited in any manner except as set forth in the claims hereunto appended.

Having thus described my invention what I claim is:

1. A fishing float comprising a body having a slot formed therein, a plate secured to one end of the float, and a clamping member pivoted to the plate for swinging movement to a position to clamp the line.

2. A fishing float comprising a body formed with a slot, a plate secured to one end of the body and formed with a flange, and a clamping member pivoted to the plate for swinging movement to a position to clamp the line against said flange.

3. A fishing float comprising a body formed with a slot, a plate secured to one end of the body and formed with a flange, and a clamping member pivoted to the plate for swinging movement to a position to clamp the line against said flange, said plate being provided with a knob for holding said member in clamping position.

4. A fishing float comprising a body formed with a slot, a plate secured to one end of the body and formed with a flange, and a clamping member pivoted to the plate for swinging movement to a position to clamp the line against said flange, said plate being provided with a knob for holding said member in clamping position, and a hook arranged at the other end of the body for coöperation with said member for holding the line in said slot.

5. A fishing float comprising a body having a slot, and a shoulder, and a member movably supported by the body for clamping the line against said shoulder and holding the line in said slot.

In testimony whereof I affix my signature.

RICHARD O. WELLS, Sr.